United States Patent
Smith et al.

(10) Patent No.: US 8,195,877 B2
(45) Date of Patent: Jun. 5, 2012

(54) CHANGING THE REDUNDANCY PROTECTION FOR DATA ASSOCIATED WITH A FILE

(75) Inventors: Gary S. Smith, Auburn, CA (US); James Burl Tate, Scottsdale, AZ (US)

(73) Assignee: Hewlett Packard Development Company, L.P., Houston, TX (US)

( * ) Notice: Subject to any disclaimer, the term of this patent is extended or adjusted under 35 U.S.C. 154(b) by 461 days.

(21) Appl. No.: 12/432,035

(22) Filed: Apr. 29, 2009

(65) Prior Publication Data

US 2010/0281213 A1    Nov. 4, 2010

(51) Int. Cl.
  *G06F 13/00* (2006.01)
  *G06F 13/28* (2006.01)
  *G06F 11/00* (2006.01)
  *G06F 11/16* (2006.01)

(52) U.S. Cl. ......... 711/114; 711/111; 711/112; 714/6.2; 714/6.21; 714/6.22; 714/6.23; 714/6.24

(58) Field of Classification Search .................. 711/111, 711/114, E12.001, E12.002, 112; 714/6.2, 714/6.21, 6.22, 6.23, 6.24
See application file for complete search history.

(56) References Cited

U.S. PATENT DOCUMENTS

| | | | |
|---|---|---|---|
| 6,275,898 B1 * | 8/2001 | DeKoning | 711/114 |
| 6,671,772 B1 * | 12/2003 | Cousins | 711/112 |
| 7,395,370 B2 | 7/2008 | Ukai | |
| 7,480,780 B2 | 1/2009 | Kitamura | |
| 2002/0133669 A1 * | 9/2002 | Devireddy et al. | 711/114 |
| 2003/0039148 A1 | 2/2003 | Riedle | |
| 2003/0188097 A1 * | 10/2003 | Holland et al. | 711/114 |
| 2003/0221060 A1 | 11/2003 | Umberger | |
| 2005/0086429 A1 | 4/2005 | Chatterjee | |
| 2005/0132212 A1 * | 6/2005 | Haswell | 713/193 |
| 2005/0182992 A1 * | 8/2005 | Land et al. | 714/701 |
| 2006/0167838 A1 * | 7/2006 | Lacapra | 707/2 |
| 2007/0143541 A1 | 6/2007 | Nichols | |
| 2008/0109601 A1 | 5/2008 | Klemm | |

OTHER PUBLICATIONS

Expanding Storage Capacity—A Primer, HighPoint Technologies, Inc. (www.highpoint-tech.com) (3 pages), dated on or earlier than Apr. 1, 2009.

* cited by examiner

Primary Examiner — J. H. Hur

(57) ABSTRACT

A storage subsystem provides redundancy protection for data associated with files stored in a storage subsystem. A request is received to change the redundancy protection for data associated with at least one of the files, where the request identifies the data for which the redundancy protection is to be changed. The redundancy protection for the data identified by the request is changed, while the redundancy protection for a remainder of the data associated with the files stored in the storage subsystem is maintained unchanged.

21 Claims, 3 Drawing Sheets

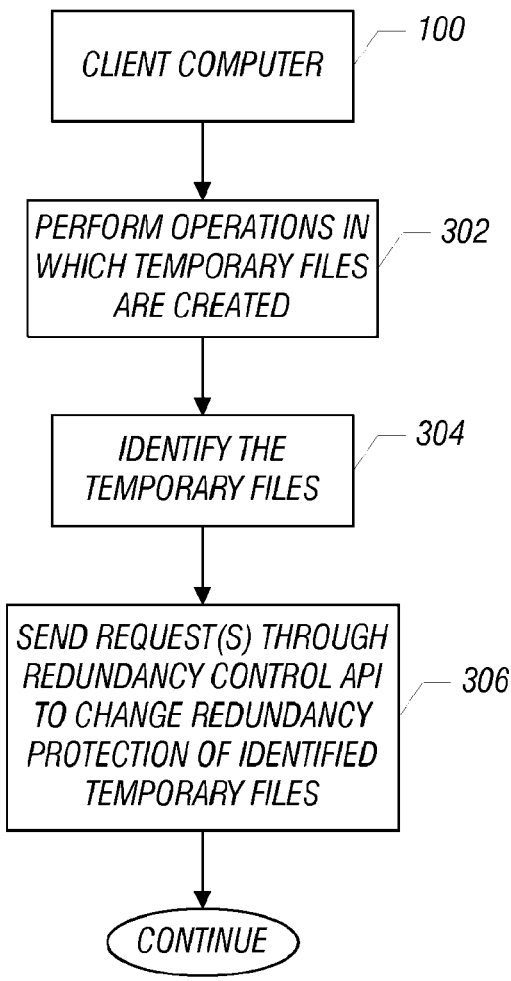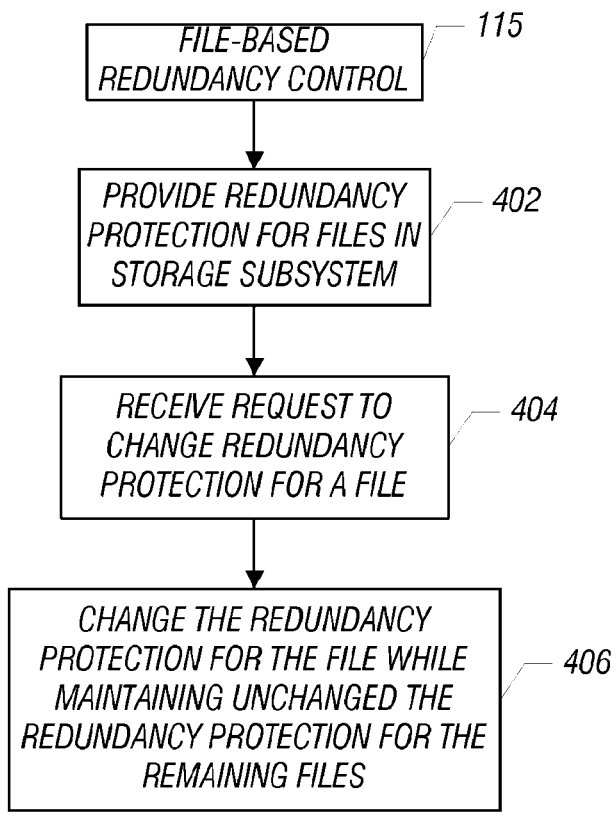
FIG. 3
FIG. 4

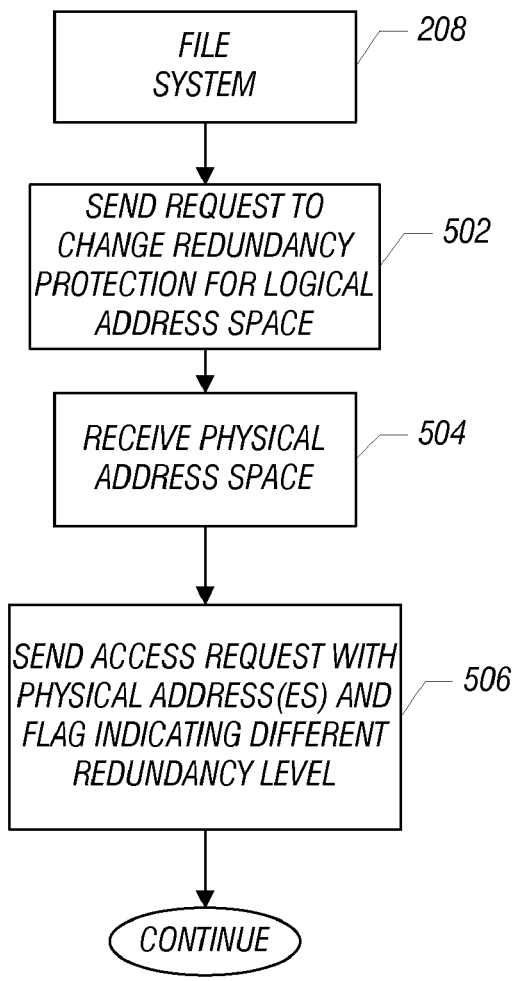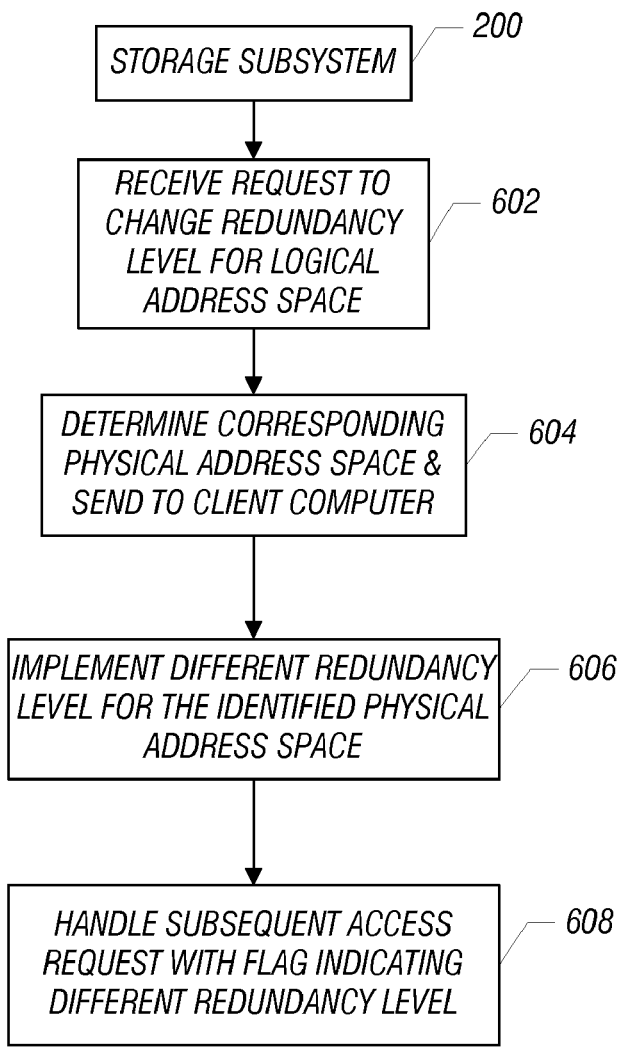
FIG. 5
FIG. 6

CHANGING THE REDUNDANCY PROTECTION FOR DATA ASSOCIATED WITH A FILE

BACKGROUND

In storage subsystems, redundancy can be provided to protect data stored in such storage subsystems. One type of redundancy is mirroring redundancy, in which data in one storage device of the storage subsystem is copied to a mirror storage device (which contains a mirror copy of the data). Another type of redundancy is parity-based redundancy, where data is stored across a group of storage devices, and parity information associated with the data is stored in another storage device. If data within any storage device in the group of storage devices were to become inaccessible (due to data error or storage device fault or failure), the parity information can be accessed to reconstruct the data. Redundancy protection can be according to one of various RAID (Redundant Array of Inexpensive Disks) schemes, such as the RAID-1 scheme to provide mirroring, or the RAID-5 or RAID-6 scheme to provide parity-based redundancy.

In some cases, conventional mechanisms of providing redundancy protection for data stored in storage subsystems may be inefficient.

BRIEF DESCRIPTION OF THE DRAWINGS

Some embodiments of the invention are described with respect to the following figures:

FIG. 3 is a flow diagram of a process performed by a client computer, according to an embodiment;

FIG. 4 is a flow diagram of a process performed by a storage subsystem according to an embodiment;

FIG. 5 is a flow diagram of a process performed by a file system, according to another embodiment; and FIG. 6 is a flow diagram of a process performed by a storage subsystem, according to another embodiment.

DETAILED DESCRIPTION

Figure 2:
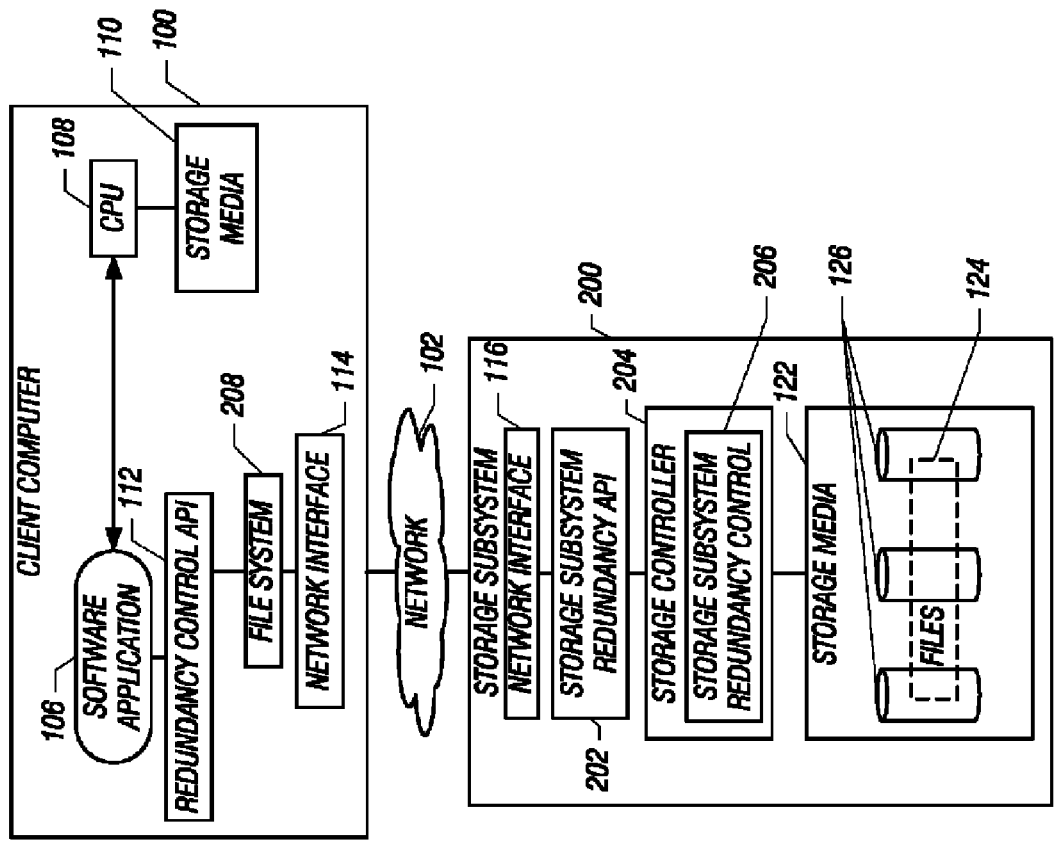
FIGS. 1 and 2 are block diagrams of exemplary arrangements that include a client computer and a storage subsystem, in which some embodiments of the invention can be incorporated.

In accordance with some embodiments, to improve storage subsystem efficiency, a mechanism is provided to select which files in the storage subsystem are provided with redundancy protection, and which other files in the storage subsystem are not provided with redundancy protection. A "file" refers to a collection of data, such as a text document, an image object, a video object, an audio object, objects used during operations of software, and so forth. A file is an element useable by application software in a computer. A file differs from storage structures maintained by storage subsystems, such as storage volumes. Redundancy protection refers to storing extra (redundancy) information to protect data stored in the storage subsystem. For example, the redundancy information can include a mirror copy of the data, or alternatively, the redundancy information can include parity information to allow for reconstruction of data in case of data error or system fault or failure.

Examples of redundancy protection are those provided by RAID (Redundant Array of Inexpensive Disks) schemes, such as the RAID-1 scheme (which provides mirroring of data) and the RAID-5 or RAID-6 scheme (which provides parity-based protection). In other implementations, other types of redundancy protection can be provided.

In some cases, it may be inefficient to provide redundancy protection for certain types of files. For example, during execution of software, temporary files may be created. In some cases, such temporary files can be relatively large. Typically, in response to a failure of fault in a storage subsystem, an operation that created the temporary files can simply abort and restart, without any loss of the underlying data on which the operation is applied. One example of a temporary file is a scratch file created during a database operation (e.g., sort operation, merge operation, join operation, and so forth), where the scratch file is used to store partially processed data for later further processing to produce a final result. There can be a relatively large number of scratch files employed if there are a correspondingly large number of concurrent operations that employ such scratch files. For database applications that employ relatively large base tables, scratch files can also be large.

In accordance with some embodiments, a mechanism is provided to allow for redundancy protection to be selectively turned off for data associated with certain files (e.g., temporary files). For example, in a storage subsystem that implements RAID-1, data on a source storage device is copied for storing in a mirror storage device. As used here, the term "storage device" refers to a physical storage element, such as a disk-spaced storage element (e.g., hard disk drive, optical disk drive, etc.) or other type of storage element (e.g., semiconductor storage element). The mechanism according to some embodiments allows mirroring to be disabled for data associated with some of the files (e.g., temporary files) in the source storage device. Turning off RAID-1 mirroring protection for data associated with temporary files and/or for any other type of file (for which mirroring protection is deemed undesirable) provides more efficient usage of storage resources in the storage subsystem.

Disabling mirroring protection for data associated with certain files can also allow for improved network bandwidth usage. To provide RAID-1 mirroring protection, two physical storage devices are typically employed, where the two physical storage devices include the source storage device and the mirror storage device. If mirroring is disabled for data associated with some of the files, then write operation performance for writing to such files is improved since two copies of the data do not have to be written to the corresponding source storage device and mirror storage device with each write operation. When RAID-1 mirroring protection is enabled for data associated with a particular file, the effective write bandwidth is reduced by half, since each write to the particular file has to occur to two storage devices. For a large scratch file that may be accessed multiple times during a database operation, disabling RAID-1 mirroring for such scratch file can provide for more efficient storage subsystem performance.

The above has referred to disabling redundancy protection for certain files stored in a storage subsystem. More generally, the mechanism according to some embodiments is able to change redundancy protection for the certain files, while maintaining unchanged the redundancy protection for the remainder of the files stored in the storage subsystem. Given that a particular redundancy protection is provided for files in the storage subsystem, changing the redundancy protection for a subset of (one or more) files means that the redundancy protection for the subset of files is either turned off (disabled) or changed to a different level of protection. For example, the particular redundancy protection for the files of the storage subsystem can be a parity-based RAID redundancy protection (e.g., RAID-5 or RAID-6 protection). Changing the redundancy protection can mean that the redundancy protection is changed from RAID-1 to RAID-5 or RAID-6, which can provide enhanced storage performance. Alternatively, changing the redundancy protection can mean that the redundancy protection is changed from the RAID-5 or RAID-6 protection to the RAID-1 protection. Switching from RAID-5 or RAID-6 to RAID-1 will increase storage space utilization, but may not improve storage performance.

In some implementations, disabling redundancy protection for a subset of files results in providing a RAID-0 distribution of such subset of files across the storage devices of the storage subsystem. RAID-0 provides striping of data across multiple storage devices without redundancy (without parity or mirroring). Striping of data across multiple storage devices involves distributing blocks of the data across the multiple storage devices according to some criterion. In one implementation in which two storage devices are used, striping of data blocks across the two storage devices can be implemented by storing even blocks on the first storage device and odd blocks on the second storage device. Alternatively, instead of using the RAID-0 distribution of data when redundancy protection is disabled, the distribution of data across multiple storage devices can be performed in a different manner. For example, in an implementation with two storage devices, the address space of the data can be divided in half, with data in the first half of the address space stored in the first storage device, and data in the second half of the address space stored in the second storage device.

In accordance with some embodiments, control of the redundancy level of data associated with files can be performed by a host, or alternatively, by both the host and the storage subsystem.

Figure 1:
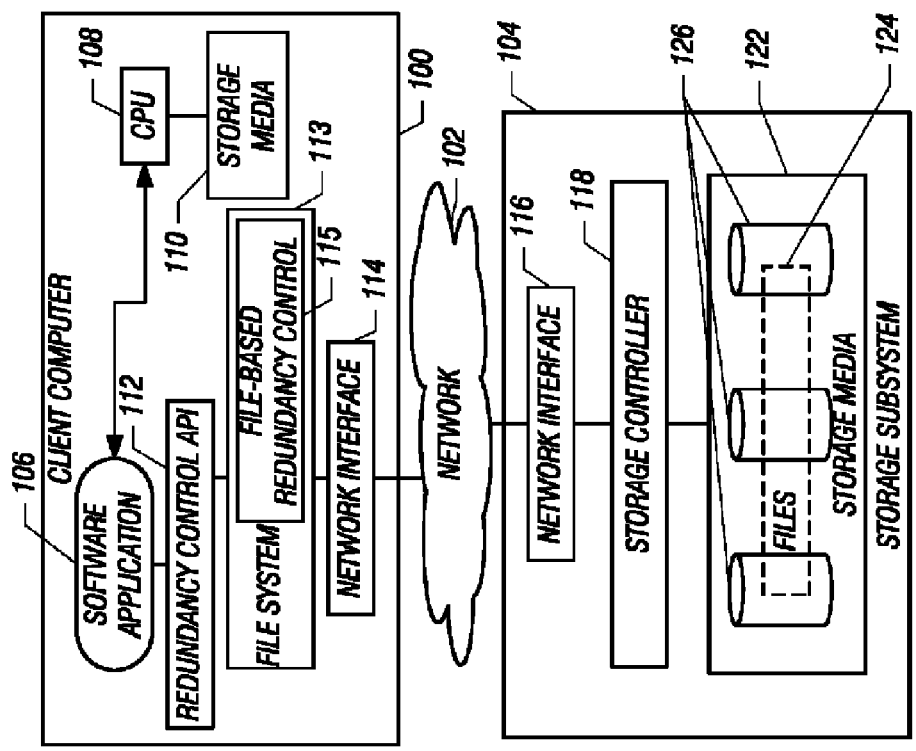

FIG. 1 illustrates an exemplary arrangement in which control of the redundancy level is performed at the host. In FIG. 1, this host includes a client computer 100, which is connected over a network 102 to a storage subsystem 104. The network 102 can be a local area network (LAN), storage area network (SAN), the Internet, or any other type of network. The client computer 100 can be a user computer, or alternatively, the client computer 100 can be a server computer that is accessible by user computers. The client computer 100 is able to issue requests to the storage subsystem 104 to perform input/output (I/O) access of data in the storage subsystem 104, where the I/O access includes writes, reads, deletes, and so forth.

The storage subsystem 104 includes a network interface 116 to allow the storage subsystem 104 to communicate over the network 102 with one or more client computers. The storage subsystem 104 also includes a storage controller 118 that is used to control access of data stored in storage media 122 (which can be disk-spaced storage media or semiconductor storage media) of the storage subsystem. The storage media 122 can include multiple physical storage devices 126. Although three physical storage devices 126 are depicted in FIG. 1, note that in alternative implementations there can be two physical storage devices or more than three storage devices. As yet another alternative implementation, instead of implementing the storage media 122 with multiple storage devices, the storage media can be implemented with one storage device having multiple partitions to allow for provision of redundancy.

As shown in FIG. 1, files 124 are stored on the storage devices 126. Redundancy protection, such as RAID-1 protection or RAID-5 or RAID-6 protection, can be implemented for at least some of the files 124. In the arrangement of FIG. 1, redundancy control is provided at the host (which in the example of FIG. 1 is the client computer 100).

The client computer 100 includes a software application 106, which is executable on one or more central processing units (CPUs) 108 in the client computer 100. The CPU(s) 108 is (are) connected to storage media 110. The client computer 100 also includes a network interface 114 to allow for communication between the client computer 100 and the network 102.

During operation of the software application 106 in the client computer 100, one or more temporary files may be created. In some examples, the software application 106 can be a database software application, and the temporary files can be scratch files to temporarily store partially processed data in database operations, which can include sort, merge, join, and/or other types of operations. The software application 106 is able to identify such temporary files.

The software application 106 can send requests through a redundancy control API (application programming interface) 112 to a file system 113 in the client computer 100 to change the redundancy protection for such temporary files that are stored in the storage media 122 of the storage subsystem 104. The "file system" of a computer refers to the mechanism in the computer for storing and organizing files associated with the computer.

In a different embodiment, instead of a redundancy control API 112, some other type of interface can be used to allow for requests for selectively changing redundancy protection of files to be sent from the software application 106 to the file system 113.

In accordance with some embodiments, the file system 113 includes a file-based redundancy control module 115, which controls provision of redundancy for the files 124 stored in the storage subsystem 104. The file-based redundancy control module 115 is responsive to requests from the software application 106 to provide selective control of redundancy protection for individual ones of the files 124 (or subsets of the files) stored in the storage subsystem 104. The file-based redundancy control module 115 is responsive to such requests to selectively change redundancy protection for selected one(s) of the files 124 in the storage media 122 of the storage subsystem 104.

The file-based redundancy control module 115 can be a software module that is executable on the CPU(s) 108 of the client computer 100. Alternatively, the file-based redundancy control module can be implemented with firmware that is embedded in internal storage of an integrated circuit chip in the computer 100. As yet another alternative implementation, the file-based redundancy control module 115 may be a hardware device with fixed circuitry.

FIGS. 3 and 4 depict processes performed in the client computer 100 to implement host-based redundancy control of files stored in the storage subsystem 104, according to an embodiment. As depicted in FIG. 3, the client computer 100 performs (at 302) operations (such as operations due to execution of the software application 106 in FIG. 1) in which temporary files are created. The software application 106 then identifies (at 304) the temporary files. Request(s) are then sent (at 306) by the software application 106 through the redundancy control API 112 (FIG. 1) to change the redundancy level of identified temporary files. The request(s) contain(s) identifiers of such files of which the redundancy level is to be changed. The identifiers can be in the form of a file name, a uniform resource locator (URL), a pathname, and so forth. A request can specify that the redundancy protection for the identified temporary file is to be disabled, or alternatively, the request can specify that the redundancy protection is to be changed from a first level (e.g., RAID-5 or RAID-6) to a different level (e.g., RAID-1). Note that the request to change the redundancy protection for the identified file(s) can be submitted upon creation of such file(s). For example, upon creation of a temporary file, a request can be submitted specifying that redundancy protection is to be changed (from the protection normally offered other files).

FIG. 4 is a flow diagram of a process performed by the file-based redundancy control module 115 according to an embodiment. The file-based redundancy control module 115 provides (at 402) redundancy protection (e.g., RAID-1 protection) for files in the storage subsystem, such as the files 124 in the storage media 122 shown in FIG. 1. Next, the file-based redundancy control module 115 receives a request (at 404) to change the redundancy protection for a file (such as from RAID-1 to RAID-0). Although reference is made to a request to change redundancy protection for one file, it is noted that the request can also specify that redundancy protection is to be changed for multiple files. The request can identify such one or more files for which redundancy protection is to be changed.

In response to the request, the redundancy protection for the file(s) identified by the request is changed (at 406) (e.g., changed from RAID-1 to RAID-0), while the redundancy protection for the remaining files are maintained unchanged (e.g. maintained at RAID-1). With RAID-0 distribution, the file(s) identified by the request is (are) striped across the source and mirror storage devices.

When changing from RAID-1 to RAID-0, files that are arranged according to RAID-1 and files that are arranged according to RAID-0 can be stored on the same set of storage devices 126 (e.g., a pair of storage devices 126). However, when changing from RAID-5 or RAID-6 to RAID-1 or RAID-0, then the files arranged according to RAID-5 or RAID-6 can be kept in the original set of storage devices, while the files arranged according to RAID-1 or RAID-0 will be moved from the original set of storage devices to another set of storage devices (or to different partitions in the original set of storage devices). Thus, when performing a redundancy level change from RAID-5 or RAID-6 to a lower level, migration (to a different storage location) of data associated with the files subject to the lower level of protection will occur. Migration would also occur when changing the redundancy protection level from RAID-0 or RAID-1 to RAID-5 or RAID-6.

FIG. 2 shows an alternative arrangement in which control of redundancy protection of files is performed based on cooperation between a file system 208 in the client computer 100 and components of a storage subsystem 200. The storage subsystem 200 includes a storage subsystem redundancy API 202, and a storage controller 204 that includes a storage subsystem redundancy control module 206. The storage subsystem redundancy API 202 allows interaction between the storage subsystem 200 and the client computer 100 for performing redundancy protection control of data stored in the storage subsystem 200.

The storage subsystem redundancy control module 206 manages provision of redundancy protection (e.g., RAID protection) of data associated with the files 124 stored in the storage media 122. Note that the storage subsystem redundancy control module 206 manages redundancy control at a physical address level, rather than at the file level.

As in FIG. 1, the client computer 100 includes the software application 106, CPU 108, storage media 110, and redundancy control API 112 that is used by the software application 106 to request changes to the redundancy protection of files (in a procedure similar to the procedure of FIG. 3). The requests to change the redundancy protection of files are sent through the redundancy control API 112 to a file system 208 in the client computer 100.

Upon receiving a request to change the redundancy protection of a file through the redundancy control API 112, the file system 208 performs the procedure depicted in FIG. 5. In response to such request, the file system 208 in the client computer 100 sends (at 502) a redundancy protection change request to the storage subsystem 200, where this request specifies a logical address space (contiguous or non-contiguous address space) of data associated with the file for which the redundancy protection is to be changed.

The storage subsystem 200 determines the physical address space (contiguous or non-contiguous address space) that corresponds to the logical address space of the redundancy protection change request. For example, the physical address space can include a number of sectors of disks that are part of the storage media 122. The determined physical address space is received (at 504) by the file system 208 from the storage subsystem 200 through the storage subsystem redundancy API 202. Information relating to this physical address space is stored by the file system 208. Subsequently, the file system 208 can send (at 506) an access request (e.g., read request or write request) to the storage subsystem 200, where the access request contains the physical address(es) of the data (contained in a file 124) to be accessed. The access request also includes a flag (or other indicator) specifying that the access request is associated with data that is stored at a "non-native" redundancy level (e.g., RAID-0 instead of RAID-1, which is the native redundancy level of data on the storage subsystem 100).

FIG. 6 is a flow diagram of a process performed at the storage subsystem 200 in accordance with an embodiment. The redundancy protection change request submitted by the file system 200 (502 in FIG. 5) is received (at 602) by the storage subsystem redundancy API 202 in the storage subsystem 200. In response, the storage subsystem redundancy API 202 asks the storage controller 204 for the physical address space corresponding to the logical address space that is the subject of the redundancy protection change request.

The storage controller 204 determines (at 604) the physical address space (e.g., disk sectors) corresponding to the logical address space of the redundancy protection change request. The storage controller 204 returns this physical address space to the storage subsystem redundancy API 202, which in turns sends information relating to the physical address space back to the file system 208 in the client computer 100. The storage subsystem redundancy API 202 can also return the number of logical sectors to the file system 208, so that the file system 208 can update a space management table to reflect the logical space allocation.

In response to the request for changing the redundancy protection for the identified logical address space, the storage subsystem redundancy control module 206 implements (at 606) the different redundancy level for the data in the physical locations of the storage media 122 that correspond to the logical address space identified by the redundancy protection change request.

The storage controller 204 is able to handle (at 608) a subsequent access request (issued by the file system 208 in the client computer 100) that contains a flag indicating that the requested data is subject to the non-native redundancy level (e.g., RAID-0 instead of RAID-1). Based on detecting this flag, the storage controller 204 may determine that data errors may not be recoverable (e.g., if RAID-0 is implemented).

In some alternative embodiments, the redundancy level of a file can be represented by an attribute of the file. This can be useful if the file is to be shared between applications. The different applications can access the redundancy level attribute of the file to determine the redundancy level to use. In this way, if a file is copied or moved across different file systems, the file systems can store the file with the correct redundancy level.

In some implementations, it may be possible that the host RAID level is different from the storage subsystem RAID level. The host can use RAID-1 redundancy, whereas storage subsystems can use RAID-5 or RAID-6 redundancy. Techniques according to some embodiments for changing redundancy levels can also be applied in such implementations. This solution in effect has two distinct levels of redundancy, where data is protected by both dual copies (replicates) with RAID-1, and each RAID-1 copy is again protected by RAID-5/6 redundancy.

Instructions of software described above (including the file-based redundancy control module 115, software application 106, file system 113 or 208, storage subsystem redundancy API 202, and storage subsystem redundancy control module 206 of FIG. 1 or 2) are loaded for execution on a processor. The processor includes CPUs (e.g., CPU(s) 108 in FIG. 1 or 2), microprocessors, microcontrollers, processor modules or subsystems (including one or more microprocessors or microcontrollers), or other control or computing devices (such as storage controller 118 or 204 in FIG. 1 or 2). As used here, a "processor" can refer to a single component or to plural components (e.g., single CPU or multiple CPUs).

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components. The instructions can be stored as drive firmware in flash memory within a tape storage device, for example.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A system comprising:
a processor to:
control redundancy protection for data of files stored in plural storage devices of a storage subsystem, wherein the redundancy protection causes redundancy information to be stored on at least one of the plural storage devices of the storage subsystem;
receive a request containing an identifier of a particular one of the files, the request specifying that the redundancy protection for the particular file is to be disabled, where the particular file has a structure that differs from a storage volume in the storage subsystem; and
in response to the request, disable redundancy protection for the particular file stored in the plural storage devices.

2. The system of claim 1, wherein the particular file for which redundancy protection has been disabled is distributed across the plural storage devices.

3. The system of claim 1, wherein the redundancy protection comprises RAID (Redundant Array of Inexpensive Disks) protection that provides mirroring or parity-based protection.

4. The system of claim 3, wherein disabling redundancy protection for the particular file causes the particular file to be stored in the plural storage devices according to a RAID-0 arrangement.

5. The system of claim 1, comprising a computer having a file system to control redundancy protection for the files stored in the storage subsystem.

6. A method comprising:
controlling, using a control module, redundancy protection for files stored in a storage subsystem;
receiving, with the control module and from an entity that created a particular file stored in the storage subsystem, a request that identifies the particular file and specifies a change of the redundancy protection for the particular file, wherein the control module is separate from the entity; and
in response to the request, changing, by the control module, the redundancy protection for the particular file while maintaining unchanged the redundancy protection for other files stored in the storage subsystem.

7. The method of claim 6, wherein changing the redundancy protection for the particular file identified by the request comprises disabling the redundancy protection for the particular file identified by the request.

8. The method of claim 6, wherein changing the redundancy protection for the particular file identified by the request comprises changing the redundancy protection for the particular file identified by the request from a first level of redundancy protection to a second, different level of redundancy protection.

9. The method of claim 6, wherein controlling the redundancy protection for the files comprises providing a first level of RAID (Redundant Array of Inexpensive Disks) protection, wherein changing the redundancy protection for the particular file identified by the request comprises changing the redundancy protection for the particular file identified by the request to a second level of RAID protection.

10. The method of claim 9, wherein changing the redundancy protection to the second level of RAID protection comprises changing the redundancy protection to a RAID-0 distribution.

11. The method of claim 10, wherein providing the first level of RAID protection comprises providing one of RAID-1, RAID-5, and RAID-6 protection.

12. The method of claim 6, wherein the entity includes a software application that creates at least one temporary file during operation of the software application, wherein the particular file identified by the request comprises the at least one temporary file.

13. The method of claim 6, wherein the entity is a software application, and the control module is part of a file system.

14. The method of claim 6, wherein receiving the request comprises receiving the request by the control module from the entity through an interface.

15. The method of claim 6, further comprising:
    identifying, by the entity, the particular file; and
    sending, by the entity to the control module, the request based on identifying the particular file.

16. The article of claim 15, wherein changing the redundancy protection comprises disabling redundancy protection.

17. The article of claim 16, wherein disabling redundancy protection for the particular file causes the particular file to be stored using a RAID-0 distribution.

18. The article of claim 15, wherein changing the redundancy protection comprises changing a RAID protection level.

19. An article comprising at least one computer-readable storage medium containing instructions that upon execution by a processor cause the processor to:

control, with a control module, redundancy protection for files stored in a storage subsystem;
    receive, with the control module and from an entity that created a particular file stored in the storage subsystem, a request that identifies the particular file and specifies a change of the redundancy protection for the particular file, wherein the control module is separate from the entity; and
    in response to the request, change, with the control module, the redundancy protection for the particular file while maintaining unchanged the redundancy protection for other files stored in the storage subsystem.

20. The article of claim 19, wherein the entity is a software application, and the control module is part of a file system.

21. The article of claim 19, wherein the instructions upon execution cause the processor to further:
    identify, with the entity, the particular file; and
    send, with the entity to the control module, the request based on identifying the particular file.

* * * * *

UNITED STATES PATENT AND TRADEMARK OFFICE
CERTIFICATE OF CORRECTION

PATENT NO. : 8,195,877 B2  
APPLICATION NO. : 12/432035  
DATED : June 5, 2012  
INVENTOR(S) : Gary S. Smith et al.

Page 1 of 1

It is certified that error appears in the above-identified patent and that said Letters Patent is hereby corrected as shown below:

Title page, Item (73), Assignee, in column 1, line 1, delete "Hewlett Packard" and insert -- Hewlett-Packard --, therefor.

In column 9, line 10, in Claim 16, delete "article" and insert -- method --, therefor.

In column 9, line 12, in Claim 17, delete "article" and insert -- method --, therefor.

In column 9, line 15, in Claim 18, delete "article" and insert -- method --, therefor.

Signed and Sealed this  
Fourth Day of December, 2012

David J. Kappos  
*Director of the United States Patent and Trademark Office*